July 3, 1962 W. L. SIDES 3,041,811
TREE SHAKER
Filed Sept. 18, 1959 3 Sheets-Sheet 1
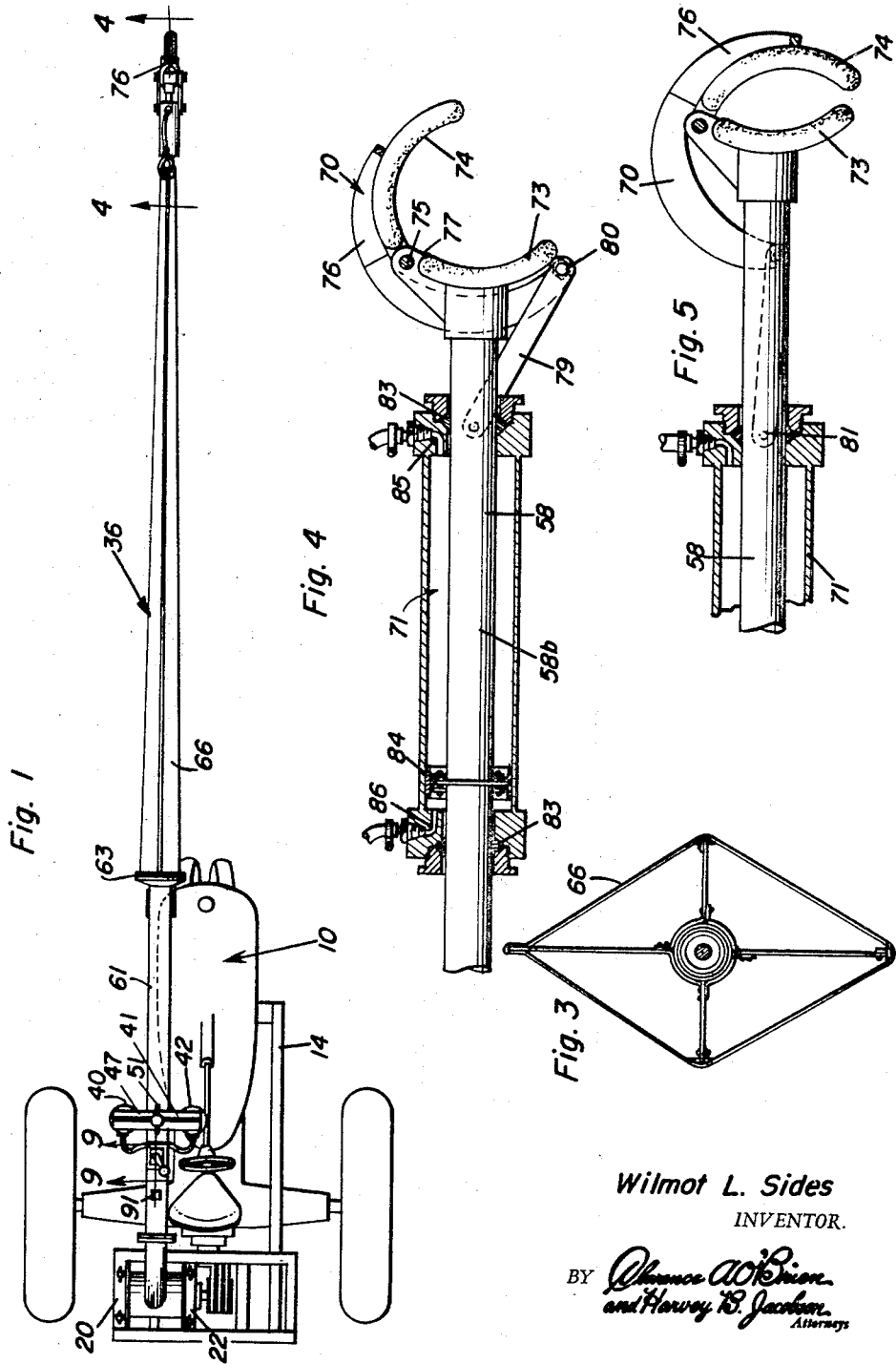
Wilmot L. Sides
INVENTOR.

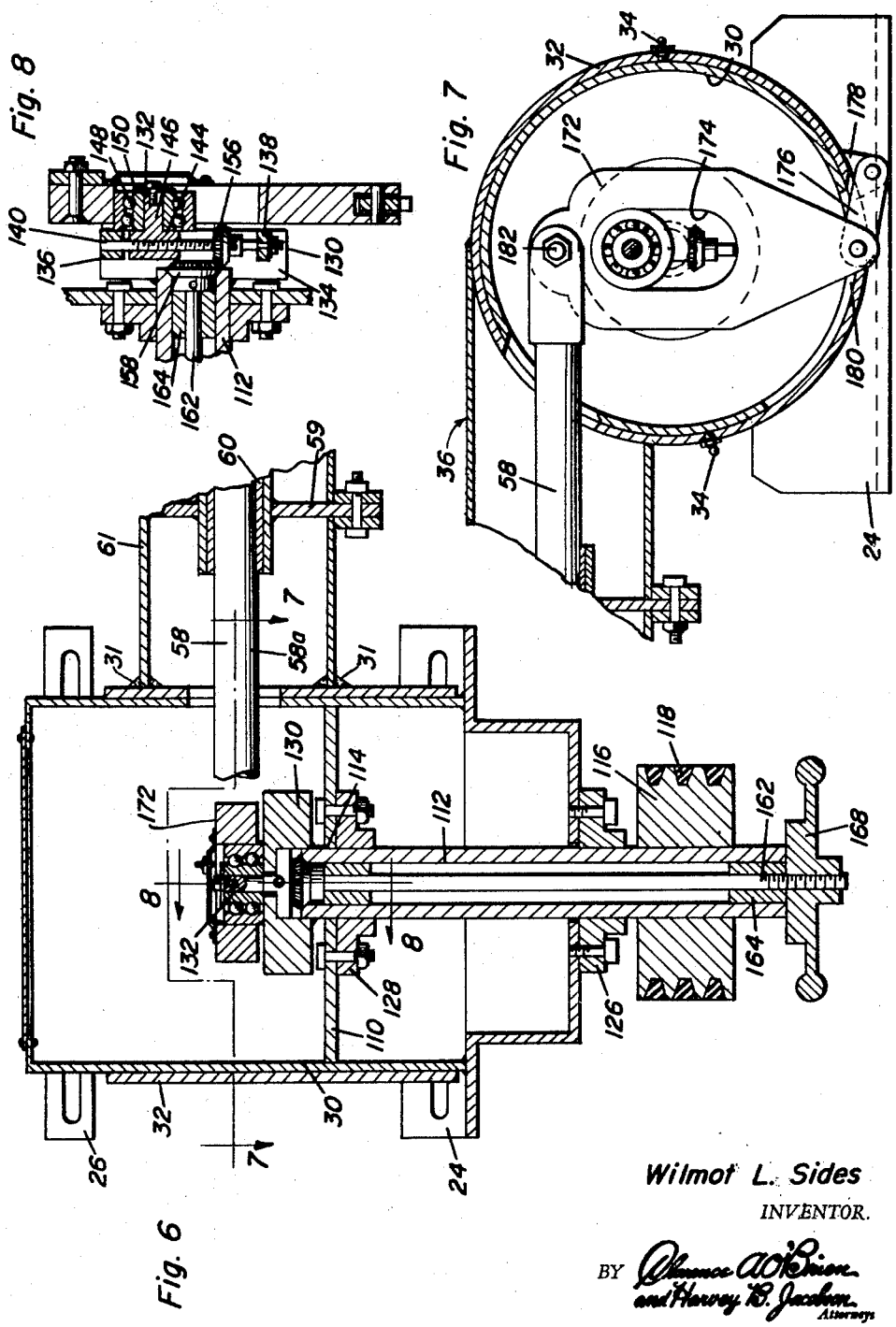

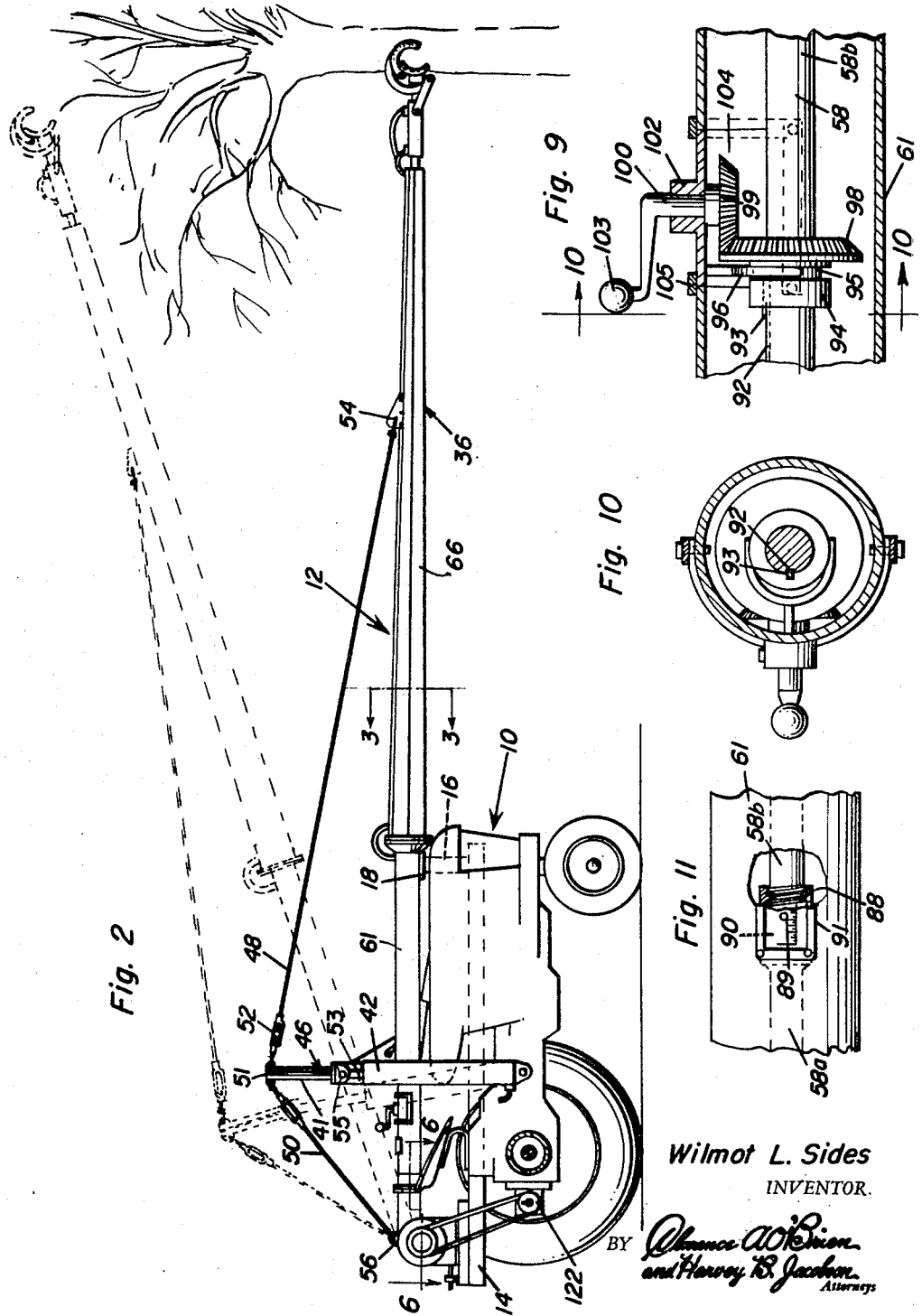

United States Patent Office 3,041,811
Patented July 3, 1962

3,041,811
TREE SHAKER
Wilmot L. Sides, Rte. 1, Goldthwaite, Tex.
Filed Sept. 18, 1959, Ser. No. 840,865
12 Claims. (Cl. 56—328)

This invention relates to tree shakers and more particularly to a tree shaker possessing advantageous features which do not exist in earlier tree shakers.

An object of the invention is to provide a structurally and functionally improved tree shaker to serve the function of shaking trees so as to aid in the recovery of fallen fruits of the tree, regardless of the nature thereof.

Briefly, a tree shaker in accordance with the invention is arranged to be carried by a conventional tractor and use power from the tractor in order to operate the shaker. The tree shaker is made of a frame designed to fit a tractor with which it is to be used, together with a boom of special construction and adapted to be raised and lowered in accordance with the desires of the user.

There are numerous important features incorporated in the shaker, one of which is an indicator to show at a glance the stroke of the rod in the boom, the stroke being adjustable by a simple maneuver of the tractor operator.

Another important feature of the invention is found in the grapple at the outer end of the boom and more particularly, the method of opening and closing the grapple.

Another feature of the invention is found in the way that the pivot is established for the boom whereby the boom may be raised and lowered with a minimum of structural complication and yet retain the capability of the stroke adjusting mechanism to function.

By and large, the tree shaker in accordance with the invention is considered superior by virtue of the structural organization thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top view of a tree shaker in accordance with the invention installed on a conventional tractor.

FIGURE 2 is a side view of the shaker showing it in use.

FIGURE 3 is an enlarged cross-sectional view in elevation showing a suggested method of reinforcing the boom and taken on the plane of line 3—3 in FIGURE 2.

FIGURE 4 is an enlarged sectional view taken on the line 4—4 of FIGURE 1 and showing the means for opening and closing the grapple at the outer end of the boom.

FIGURE 5 is a fragmentary cross-sectional view similar to FIGURE 4 but showing the grapple in the closed position.

FIGURE 6 is an enlarged cross-sectional view taken on the plane of line 6—6 in FIGURE 2 showing principally the means for mounting the boom and the adjustment mechanism whereby the stroke of the reciprocatory rod in the boom may be altered.

FIGURE 7 is a sectional view taken on the line 7—7 of FIGURE 6.

FIGURE 8 is a sectional view on an enlarged scale and taken on a line 8—8 of FIGURE 6.

FIGURE 9 is a cross-sectional view taken on the line 9—9 of FIGURE 1.

FIGURE 10 is a sectional view taken approximately on the line 10—10 of FIGURE 9.

FIGURE 11 is an enlarged fragmentary top view showing the stroke indicator of the reciprocating rod in the boom.

In the accompanying drawings there is a conventional tractor 10 diagrammatically representing a manufacturer's make of tractor capable of being equipped with tree shaker 12. The tree shaker exemplifies an embodiment of the invention and has a frame 14 by which to secure the tree shaker to the tractor. Frame 14 is tailored to fit the tree shaker and to be capable of fastening to a conventional tractor. Hardware fittings and the like may require alteration for different manufacturers' make of tractors. In any case, though, it is preferred that frame 14 has an upstanding support 16 with a cradle 18 at the top thereof to form a boom rest. Further, the rear end of frame 14 has a pair of frame members 20 and 22 (FIGURE 1) by which to support base brackets 24 and 26 (FIGURE 6) which are slotted so that bolts passing therethrough may be fastened to members 20 and 22 for adjustment. Base members 24 and 26 are secured to a cylindrical drum 30 on the outer surface of which there is a sleeve 32, this sleeve being capable of limited rotational movement. The fittings 34 are connected with sleeve 32 and are arranged to discharge grease in between the confronting surfaces of sleeve 32 and drum 30 to lubricate the surfaces. The sleeve is rotatable on the drum and has boom 36 fixed thereto, for instance, by being welded thereto as shown at 31, so that the elevation of the boom may be altered by a pivotal motion of sleeve 32 on drum 30. One way of achieving the pivotal motion is to use a pair of hydraulic cylinders 40 and 42 fixed at their lower ends, for instance to the tractor 10 or to frame 14, and operatively connected with the hydraulic power take-off of the tractor. The fluid under pressure from the tractor hydraulic system is applied to the cylinders 40 and 42 thereby extending the piston rods 43 thereof which moves across head 46 vertically. The cross head 46 is of triangular shape and comprises a horizontal plate 55 and two inclined legs 41 and 47 connected together at their ends. The members 41 and 47 are of inverted T-shaped cross-section whose lower ends are connected to the outer ends of the plate 55 and whose upper ends are secured together and connected to a fitting 51. The fitting 51 is provided with forwardly and rearwardly extending ears which are connected to the cables 50 and 48. The center of the plate 55 is connected to the upper end of a vertically extending rod 53 whose lower end is connected to the upper surface of the housing 61. The ends of the horizontal plate 55 are provided with downwardly extending ears 45 which are pivotally connected to the piston rods 43 of motors 40 and 42. Cables 48 and 50, preferably equipped with adjustment turnbuckles 52 or the like, are secured to the crosshead and to brackets 54 and 56 respectively. Bracket 56 is attached to drum sleeve 32, and bracket 54 is connected to the boom 36 well toward the outer outer end thereof. It is now evident from inspection of FIGURE 2 and the previous description that when the hydraulic cylinders 40 and 42 receive fluid under pressure, the entire boom is elevated causing it to pivot about the longitudinal axis of drum 30.

A reciprocating rod 58 is mounted within and forms part of boom 36. Webs 59 supporting bearings 60, are secured at spaced intervals in the housing 61 of boom 36 thereby mounting the rod 58 so that it is capable of reciprocation. As shown in FIGURES 3 and 2, for long lengths of boom 36, it is preferably reinforced by a truss structure 66 attached to the exterior thereof.

Grapple 70 is at the outer end of rod 58 and is open and closed by a hydraulic motor 71 of special construction (FIGURES 4 and 5). Here again, the hydraulic power take-off of the tractor is taxed for opening and closing the grapple 70. Specifically, the grapple is made of a pair of padded jaws 73 and 74, each being arcuate and joined together by means of a pivot 75 at the adjacent confronting ends thereof. Operating bracket 76 is secured to the outer surface of jaw 74, and jaw base 77 of jaw 73, is secured rigidly to the outer extremity of reciprocating rod 58. Bracket 76 is curved and in the form of a yoke (FIGURE 1), and there are a pair of links 79 pivoted by pins 80 to the non-fixed end of the bracket. This pair of links is secured by pivot 81 to the forward end of hydraulic cylinder 71 constituting the previously mentioned fluid motor. Both ends of the hydraulic cylinder have bushings or packings 83 because the entire cylinder is slidably mounted on rod 58. Piston 84 is fixed to rod 58 and functions as a divider for the cylinder 71. There are two ports 85 and 86 connected through the front and rear end walls of the hydraulic cylinder, and these have fluid lines connected therewith which extend to the hydraulic power take-off system of the tractor. Fluid is administered under pressure, under the control of a valve, to either face of piston 84, causing the entire cylinder to slide on rod 58 and thereby, through links 79, cause the jaws to be opened and closed i.e. jaw 74 moved toward or away from jaw 73 thereby completing the grapple which may be engaged with any part of a tree.

Rod 58 is made in at least two sections, for instance, sections 58a and 58b joined together by sleeve 88 which prevents axial separation, yet permits relative rotation between the sections. An indicator, for instance, a pointer 89, is secured to a sleeve 90 rigidly fixed to the inner part of rod 58a. A graduated window 91 is attached to housing 61 of boom 36 so that the pointer 89 can be inspected at all times by the tractor and shaker operator so as to determine the angular position of grapple 70 and the degree of reciprocation of the rod and sleeve. The part of rod 58b which extends from sleeve 88, has a keyway 92 (FIGURES 9 and 10) with a key 93 occupying the keyway and fitted in a slot in collar 94. Groove 95 is circumferentially formed in collar 94 and receives a fork 96 that is welded or otherwise fixed to the interior of housing 61. Accordingly, rod part 58b is capable of axial sliding movement whereas, collar 94 is restricted to rotational movement with rod part 58b. Enmeshed miter gears 98 and 99 are fixed respectivly to collar 94 and to a crank 100. The crank is mounted for rotation in a bearing 102 carried by housing 61 and has an operating knob 103 or the like at the outer extremity thereof. The entire section 104 of housing 61 containing bearing 102 is held in place by a frame 105 that is bolted or otherwise secured to the housing 61. From inspection of FIGURE 9 the operation of this feature of the shaker is evident. When the crank 100 is rotated, the gears 98 and 99 require rod part 58b to which grapple 70 is secured, to be rotated while rod part 58a remains fixed insofar as rotational movement is concerned. Further, the entire rod 58 is capable of reciprocatory movement to achieve the shaking function.

Reciprocation of rod 58 is achieved by the mechanism seen best in FIGURES 6–8. Drum 30 has a partition 110 welded or otherwise secured in it, and there is a sleeve 112 extending through an opening 114 in the center thereof. This sleeve is actually a hollow driveshaft to which drive pulley 116 is fixed. Belts 118 are engaged with the multiple pulley 116 and with a pulley 122 (FIGURE 2) attached to the power take-off of tractor 10. Bearings 126 and 128 are secured to the outer wall of bracket 24 and to partition 110 respectively thereby mounting the hollow shaft 112 for rotational movement.

Rotary member 130 is fixed, for instance by being welded, to hollow shaft 112, and it has a drive pin assembly 132 operatively connected therewith. For this construction see FIGURE 8 showing slot 134 in member 130 and containing upper and lower bearings 136 and 138 within which screw 140 is mounted for rotation. Screw 140 cannot move axially, but is capable of being rotated. Travelling nut 144 is threaded on screw 140 and has a pin 146 protruding laterally therefrom and on which an anti-friction bearing 148 is disposed and held by bearing retainer 150 attached to pin 146. By altering the position of nut 144, the axis of the pin assembly is eccentrically moved with reference to the axis of rotation of member 130, this being coincident with the axis of rotation of hollow shaft 112. The adjustment of screw 140 is achieved by a pair of enmeshed gears 156 and 158, gear 156 being screw-threaded on screw 140 and locked thereon by a setscrew or pin, and gear 158 being secured to the inner end of an adjustment shaft 162 concentrically disposed in hollow shaft 112. There are bearings 164 in the hollow shaft mounting adjustment shaft 162 for rotation, and a hand wheel 168 or the like at the outer extremity of adjustment shaft 162 enables the adjustment shaft to be easily rotated thereby altering the position of the drive pin assembly.

Rocker 172 is mounted adjacent drum 130 and has a cam slot 174 accommodating the anti-friction bearing 148. The lower end of the rocker is constrained in its movement by means of a link 176 that is pivoted to rocker 172 and pivoted to a comparatively stationary support i.e. bracket 178 which is secured to sleeve 32, the lower end of rocker 172 passing through a pair of aligned slots in the drum 30 and sleeve 32. The upper end of the rocker 172 has a pivot 182 to which the inner extremity of rod 58 is connected. Stroke adjustment for the rod 58, is, therefore, achieved by adjusting the hand wheel 168 which is ultimately reflected in displacement of the drive pin assembly 146 to cam slot 174.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree shaker adapted to be mounted on a vehicle and including a frame, a boom, means mounting the inner end of said boom on said frame for pivotal movement, a rod in said boom, a grapple at the outer end of said rod, stroke adjusting means connecting a power source with the inner end of said rod and adapted to positively reciprocate said rod back and forth.

2. A tree shaker adapted to be mounted on a vehicle and including a frame, a boom means mounting the inner end of said boom on said frame for pivotal movement, a rod in said boom, a grapple at the outer end of said rod, stroke adjusting means connected with the inner end of said rod and adapted to reciprocate said rod in two directions, indicating means connected with said rod for indicating the angular position and stroke of said rod which may be altered by said stroke adjusting means.

3. A tree shaker adapted to be mounted on a tractor and including a frame, a boom, means mounting the inner end of said boom on said frame for pivotal movement, a rod in said boom, a grapple at the outer end of said rod, stroke adjusting means connected with the inner end of said rod and adapted to reciprocate said rod, said stroke adjusting means including an eccentric drive pin, means for adjusting the position of said eccentric drive pin, a rocker engaged with said eccentric drive pin and driven thereby, means constraining the movement of one end of said rocker, and the other end of said rocker pivotally connected with said rod.

4. A tree shaker adapted to be mounted on a tractor and including a frame, a boom, means mounting the inner end of said boom on said frame for pivotal movement, a rod in said boom, a grapple at the outer end of said rod, means connected with the inner end of said rod and adapted to reciprocate said rod, said rod having an inner part and an outer part, means connecting said parts of said rod, and means connected with the outer part of said rod for rotating said rod to selected adjusted positions and thereby adjusting the orientation of said grapple which is connected with said outer part of said rod, and said last recited means comprising a gear splined to said rod and slidable thereon, thrust bearing means preventing axial movement of said gear and a crank operated gear engageable with the first recited gear.

5. A tree shaker adapted to be mounted on a tractor and including a frame, a boom, means mounting the inner end of said boom on said frame for pivotal movement, a rod in said boom, a grapple at the outer end of said rod, stroke adjusting means connected with the inner end of said rod and adapted to reciprocate said rod, said rod having an inner part and an outer part, means connecting said parts of said rod for relative rotation, and means connected with the outer part of said rod for rotating said rod to selected adjusted positions and thereby adjusting the orientation of said grapple which is connected with said outer part of said rod, stroke indicating means connected with said inner part of said rod to indicate the stroke and angular position of said rod and an opening provided in said boom for viewing said indicating means.

6. A tree shaker adapted to be mounted on a tractor and including a frame, a boom, means mounting the inner end of said boom on said frame for pivotal movement, a rod in said boom, a grapple at the outer end of said rod, stroke adjusting means connected with the inner end of said rod and adapted to reciprocate said rod, said stroke adjusting means including an eccentric drive pin, means for adjusting the position of said eccentric drive pin, a rocker engaged with said eccentric drive pin and driven thereby, means constraining the movement of one end of said rocker, and the other end of said rocker pivotally connected with said rod, said means pivotally mounting the inner end of said boom including a drum attached to said frame, a sleeve mounted for rotation on said drum, and said rocker and drive pin disposed within said drum.

7. In a tree shaker which has a frame, a boom, a fixed drum, a sleeve mounted on said drum, said boom secured at its inner end to said sleeve, a rod extending through said boom, means connected with the inner end of said rod and disposed in said drum for reciprocating said rod, and a grapple connected with the outer end of said rod, remotely controlled means connected with said grapple for opening and closing said grapple, and means for rotating at least a part of said rod for orienting said grapple to selected rotational positions.

8. The subject matter of claim 7 wherein the means for reciprocating said rod drives it in both directions and are adjustable to adjust the stroke of said rod, and an indicator by which to indicate the stroke of said rod.

9. In a tree shaker which has a hollow boom, a reciprocating rod in said boom, means for driving said rod in a reciprocatory motion and for adjusting the stroke of said rod, said rod including an inner rod part and outer rod part, connecting means connecting said parts so that the outer part is rotationally connected with the inner part, a grapple connected with said outer part whereby said grapple may be adjusted rotationally in response to rotation of said outer part of said rod, grapple actuating means connected with said grapple, said grapple actuating means including a hydraulic cylinder mounted for axial sliding movement on said outer part of said rod, and means to apply liquid under pressure to opposite ends of said cylinder, and a piston in said cylinder and fixed to said outer part of said rod.

10. The subject matter of claim 9 wherein there is an indicator means connected with said rod and boom to indicate the stroke of said rod.

11. A tree shaker adapted to be mounted on wheels and including a frame, a boom pivotally mounted on its inner end to said frame for pivotal movement, a rod in said boom, grapple means secured to the outer end of the rod, operating means connected with the inner end of said rod including a rotating eccentric drive means, a rocker arm pivoted to said frame at one end, a first connection between said eccentric drive means and said arm spaced from the pivot between the arm and frame and a second connection between said rod and said rocker whereby said rod is reciprocated faster in one direction than the other direction, said second connection spaced from said pivot and said first connection.

12. A tree shaker as defined in claim 11 wherein said eccentric and first connection comprises a pin rotatable about an axis spaced from and parallel to the pin, said arm having a longitudinal slot therein, said pin extending into said slot for reciprocating movement therein as it rotates about said axis.

References Cited in the file of this patent
UNITED STATES PATENTS

| | | |
|---|---|---|
| 1,626,068 | Bartlett | Apr. 26, 1927 |
| 2,159,311 | Berger | May 23, 1939 |
| 2,804,743 | Gould et al. | Sept. 3, 1957 |
| 2,891,372 | Goodwin | June 23, 1959 |